United States Patent
Lee et al.

(10) Patent No.: US 9,532,383 B2
(45) Date of Patent: Dec. 27, 2016

(54) METHOD FOR PERFORMING RANDOM ACCESS IN WIRELESS COMMUNICATION SYSTEM AND DEVICE SUPPORTING SAME

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 14/115,281

(22) PCT Filed: May 2, 2012

(86) PCT No.: PCT/KR2012/003417
§ 371 (c)(1),
(2), (4) Date: Nov. 1, 2013

(87) PCT Pub. No.: WO2012/150801
PCT Pub. Date: Nov. 8, 2012

(65) Prior Publication Data
US 2014/0071930 A1    Mar. 13, 2014

Related U.S. Application Data

(60) Provisional application No. 61/481,688, filed on May 2, 2011.

(51) Int. Cl.
*H04W 74/08* (2009.01)
*H04W 48/16* (2009.01)
*H04W 72/02* (2009.01)
*H04W 28/06* (2009.01)

(52) U.S. Cl.
CPC ......... *H04W 74/0833* (2013.01); *H04W 28/06* (2013.01); *H04W 48/16* (2013.01); *H04W 72/02* (2013.01)

(58) Field of Classification Search
None
See application file for complete search history.

(56) References Cited

U.S. PATENT DOCUMENTS

| 2009/0186613 A1* | 7/2009 | Ahn et al. ...................... 455/434 |
| 2009/0316637 A1* | 12/2009 | Yi .......................... H04W 72/10 370/329 |
| 2011/0170515 A1* | 7/2011 | Kim .................... H04W 72/042 370/330 |

FOREIGN PATENT DOCUMENTS

| JP | 2009065509 A | 3/2009 |
| KR | 100485536 B1 | 4/2005 |
| KR | 1020090063141 A | 6/2009 |
| KR | 1020090074106 A | 7/2009 |

* cited by examiner

*Primary Examiner* — Yeman Mesfin
*Assistant Examiner* — Jeff Banthrongsack
(74) *Attorney, Agent, or Firm* — Dentons US LLP

(57) ABSTRACT

Provided is a method for performing random access of a terminal in a wireless communication system. The method receives information about at least one first sub-frame from a base station, selects at least one second sub-frame from at least one first sub-frame, and transmits a random access preamble in a randomly selected sub-frame from at least one second sub-frame if the terminal is a specific type. If the terminal is not a specific type, the random access preamble is transmitted from the randomly selected sub-frame from at least one first sub-frame.

14 Claims, 12 Drawing Sheets

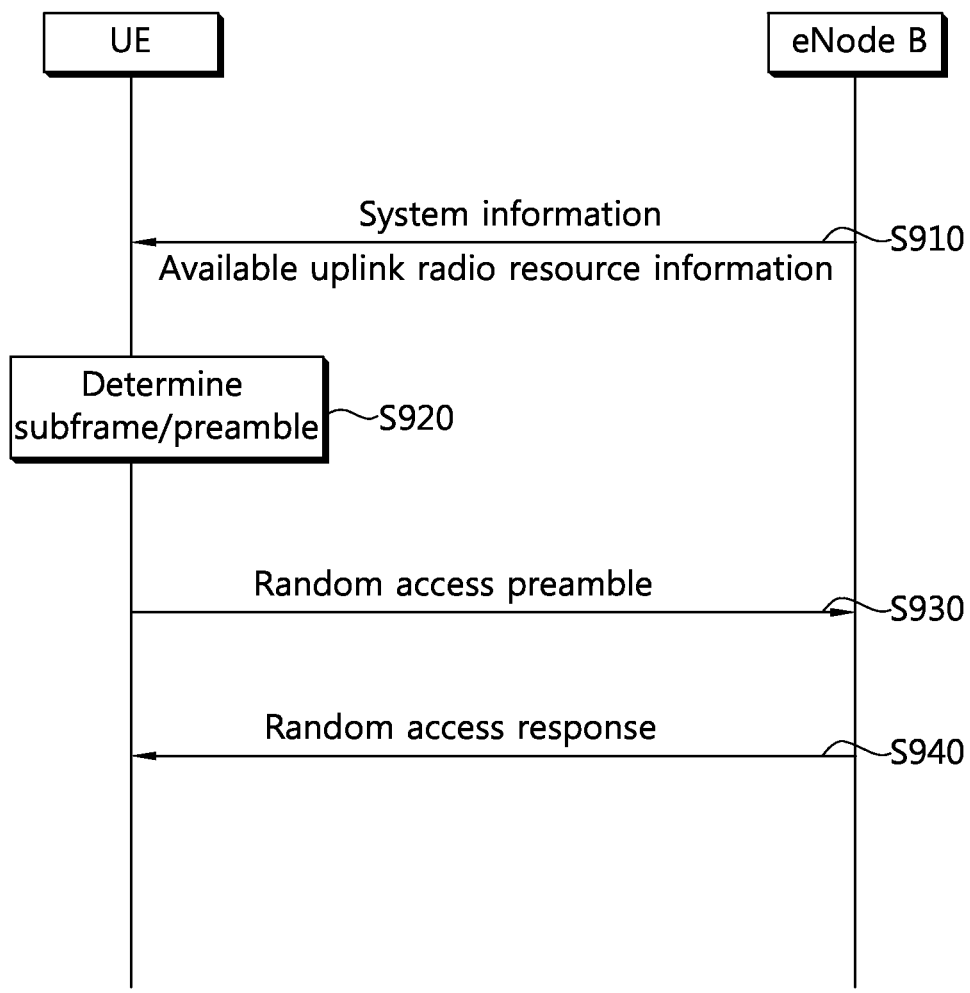

FIG. 10

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

METHOD FOR PERFORMING RANDOM ACCESS IN WIRELESS COMMUNICATION SYSTEM AND DEVICE SUPPORTING SAME

This application is a national stage application of International Application No. PCT/KR2012/003417, filed on May 2, 2012, which claims priority to and the benefit of U.S. Provisional Application No. 61/481,688, filed on May 2, 2011, the entire contents of which are incorporated herein by reference.

TECHNICAL FIELD

The present invention relates to wireless communication and, more particularly, to a method for performing random access in a wireless communication system and a device supporting the same.

BACKGROUND ART

3$^{rd}$ Generation Partnership Project (3GPP) Long Term Evolution (LTE), that is, the improvement of a Universal Mobile Telecommunications System (UMTS), is introduced as 3GPP release 8. 3GPP LTE uses Orthogonal Frequency Division Multiple Access (OFDMA) in downlink and uses Single Carrier-Frequency Division Multiple Access (SC-FDMA) in uplink. 3GPP LTE adopts Multiple Input Multiple Output (MIMO) having a maximum of 4 antennas. 3GPP LTE-Advanced (LTE-A), that is, the evolution of 3GPP LTE, is recently being discussed.

In general, a terminal performs random access in order to access a network. Random access can be divided into contention-based random access and non-contention-based random access. The greatest difference between contention-based random access and non-contention-based random access is whether or not a random access preamble is dedicated to one terminal. In non-contention-based random access, a contention (or collision) with other terminals is not generated because a terminal uses a dedicated random access preamble designated thereto. Here, a contention means that two or more terminals attempt random access using the same random access preamble through the same resources. In contention-based random access, there is a possibility of a contention because a terminal uses a randomly selected random access preamble.

Random access is performed in order to perform uplink synchronization or to request the allocation of uplink radio resources. For example, after being initially powered on, a terminal can perform downlink synchronization and then perform random access in order to obtain uplink synchronization. For another example, in the state in which a Radio Resource Control (RRC) connection has not been established, a terminal can perform random access in order to have uplink radio resources for uplink transmission allocated thereto. For yet another example, a terminal may perform random access in order to initially access a target base station in a handover process.

Meanwhile, the number of terminals included in one cell can be suddenly increased in a wireless communication system due to techniques, such as recently introduced Machine Type Communication (MTC). The execution of random access by numerous terminals can generate a problem in that a load of the system is excessively increased. Accordingly, there is a need for a method of efficiently performing, by a terminal, random access in a wireless communication system including numerous terminals.

DISCLOSURE

Technical Problem

An object of the present invention is to provide a method for performing random access in a wireless communication system and a device supporting the same.

Technical Solution

[Claim 1]
In an aspect, a method of performing random access, by user equipment (UE), in a wireless communication system is provided. The method includes receiving information about at least one first subframe from a base station (BS), selecting at least one second subframe of the at least one first subframe, and transmitting a random access preamble in a subframe randomly selected from the at least one second subframe if the UE is a specific type. If the UE is not a specific type, the random access preamble is transmitted in the subframe randomly selected from the at least one first subframe.

A type of the UE may be a Machine Type Communication (MTC) device which performs inter-device communication without user intervention.

The method may further include receiving information about the second subframe from the BS. The information about the second subframe may indicate whether or not each first subframe is able to be selected as the second subframe.

The information about the second subframe may be a bitmap sequence. If a specific bit corresponding to each first subframe is 1, the information about the second subframe may indicate that each first subframe is able to be selected as the second subframe. If the specific bit is 0, the information about the second subframe may indicate that each first subframe is unable to be selected as the second subframe.

The information about the first subframe may include a random access channel configuration index. The random access channel configuration index may be mapped to a set of subframe index values of the respective at least one first subframe.

The information about the first subframe and the information about the second subframe may be included in system information broadcasted by the BS and are transmitted.

The information about the first subframe further may include a format indicator indicative of a random access preamble format corresponding to the random access channel configuration index.

The transmitted random access preamble may be the random access preamble format indicated by the format indicator.

In another aspect, a radio device performing random access in a wireless communication system is provided. The radio device includes a Radio Frequency (RF) unit transmitting and receiving radio signals, and a processor functionally connected to the RF unit. The processor is configured to receive information about at least one first subframe from a BS, select at least one second subframe of the at least one first subframe, and transmit a random access preamble in a subframe randomly selected from the at least one second subframe if the radio device is a specific type. If the radio device is not a specific type, the random access preamble is transmitted in the subframe randomly selected from the at least one first subframe.

A type of the radio device may be a Machine Type Communication (MTC) device which performs inter-device communication without user intervention.

The processor may be configured to receive information about the second subframe from the BS. The information about the second subframe may indicate whether or not each first subframe is able to be selected as the second subframe.

The information about the second subframe may be a bitmap sequence. If a specific bit corresponding to each first subframe is 1, the information about the second subframe may indicate that each first subframe is able to be selected as the second subframe. If the specific bit is 0, the information about the second subframe may indicate that each first subframe is unable to be selected as the second subframe.

The information about the first subframe may include a random access channel configuration index. The random access channel configuration index may be mapped to a set of subframe index values of the respective at least one first subframe.

The information about the first subframe and the information about the second subframe may be included in system information broadcasted by the BS and are transmitted.

The information about the first subframe may further include a format indicator indicative of a random access preamble format corresponding to the random access channel configuration index.

The transmitted random access preamble may be the random access preamble format indicated by the format indicator.

Advantageous Effects

In performing random access, UE can check that what subframes are available based on available uplink radio resources information, check a specific subframe of the available subframes if its own UE type is a specific type of UE, and transmit a random access preamble based on the specific subframe. That is, quality of service can be guaranteed even in a special radio environment, such as Machine Type Communication (MTC), because radio resources for the random access of a specific type of UE are further restricted, and radio resources for the random access of common UE are sufficiently guaranteed.

A BS can detect overload for specific access by a specific type of UE and overload for common access by common UE and control the allocation/use of radio resources for the specific type of UE and/or the common UE based on the detected overload. This can improve efficiency of the access/use of radio resources, thereby being capable of improving the overall efficiency of a wireless communication system.

DESCRIPTION OF DRAWINGS

FIG. 9 is a flowchart showing a method of performing random access in accordance with an embodiment of the present invention.

FIG. 10 is a diagram showing available uplink radio resources for random access in accordance with an embodiment of the present invention.

MODE FOR INVENTION

Figure 1:
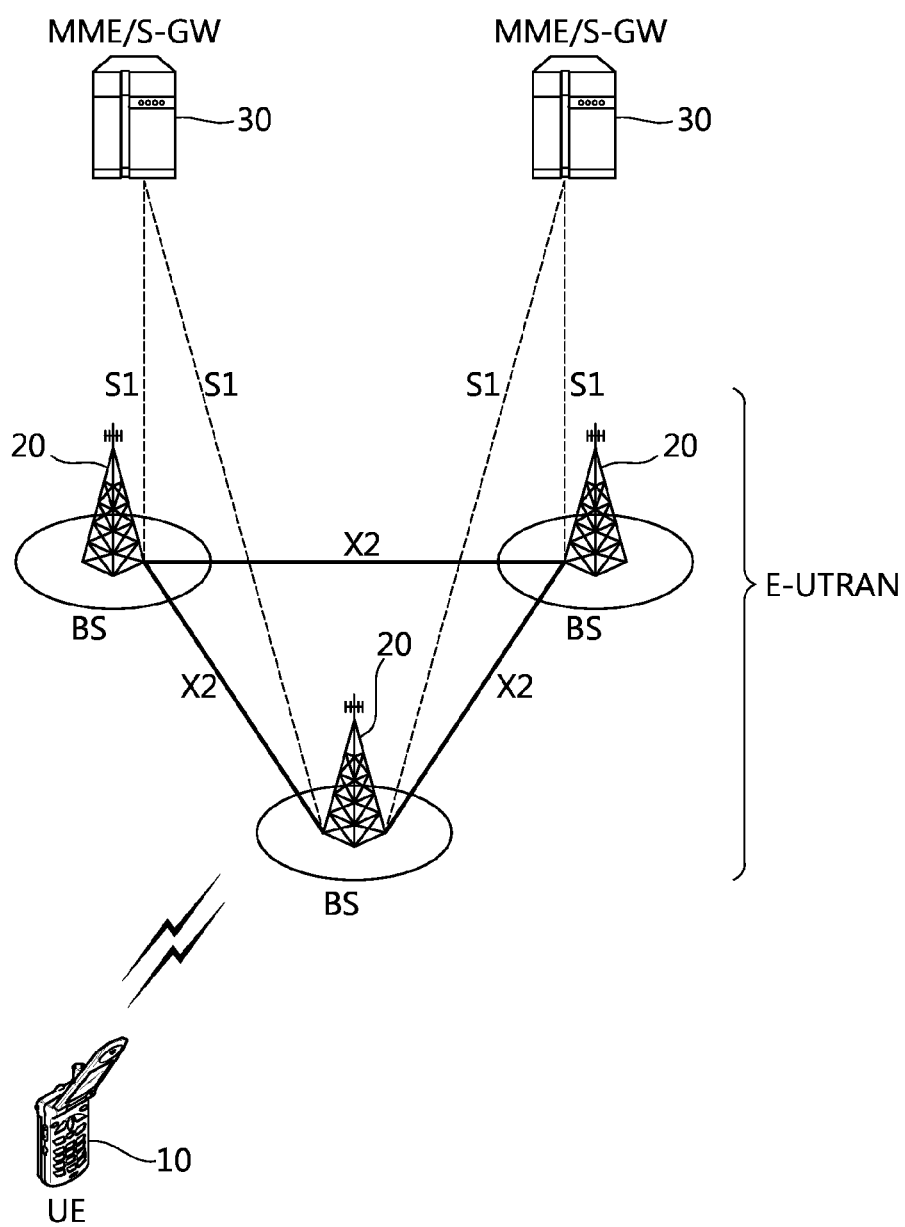
FIG. 1 shows a radio communication system to which the present invention is applied.

FIG. 1 shows a radio communication system to which the present invention is applied. This may also be called an Evolved-UMTS Terrestrial Radio Access Network (E-UTRAN) system or a Long Term Evolution (LTE)/LTE-Advanced (LTE-A) system.

An E-UTRAN includes a Base Station (BS) 20 providing a control plane and a user plane to User Equipment (UE) 10. The UE 10 may be fixed or mobile and may also called another terminology, such as a Mobile Station (MS), a User Terminal (UT), a Subscriber Station (SS), a Mobile Terminal (MT), or a wireless device. The BS 20 refers to a fixed station that communicates with the UE 10. The BS 20 may also be called another terminology, such as an evolved-NodeB (eNB), a Base Transceiver System (BTS), or an access point.

The BSs 20 may be connected through an X2 interface. The BS 20 is connected to an Evolved Packet Core (EPC) 30 through an S1 interface, more particularly, to a Mobility Management Entity (MME) through an S1-MME and to a Serving Gateway (S-GW) through an S1-U.

The EPC 30 includes the MME, the S-GW, and a Packet Data Network-Gateway (P-GW). The MME has information about the access of UE or information about the capabilities of UE. The information is chiefly used to manage the mobility of UE. The S-GW is a gateway that has an E-UTRAN as a termination point, and the P-GW is a gateway that has a PDN as a termination point.

A radio interface protocol horizontally includes a physical layer, a data link layer, and a network layer. Furthermore, the radio interface protocol is horizontally divided into a user plane (U-plane) for the transmission of data information and a control plane (C-plane) for the transfer of a control signal (signaling).

The layers of the radio interface protocol between UE and a network may be classified into a first layer L1, a second layer L2, and a third layer L3 on the basis of three lower layers of an Open System Interconnection (OSI) reference model which is widely known in communication systems. The radio protocol layers are present in pairs between UE and an E-UTRAN and are responsible for data transmission in a radio section.

From among them, a physical layer belonging to the first layer provides information transfer service using a physical channel, and a Radio Resource Control (RRC) layer placed in the third layer functions to control radio resources between UE and the network. To this end, RRC messages are exchanged between UE and the network in the RRC layer.

Figure 2:
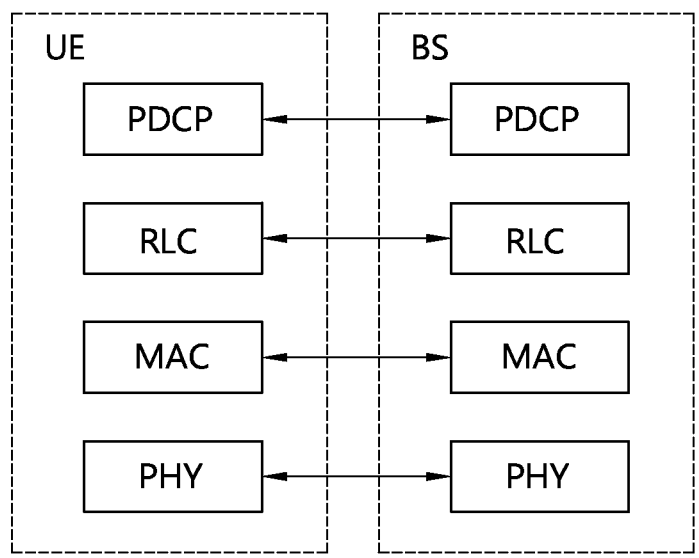
FIG. 2 is a block diagram showing a radio protocol architecture for a user plane.
Figure 3:
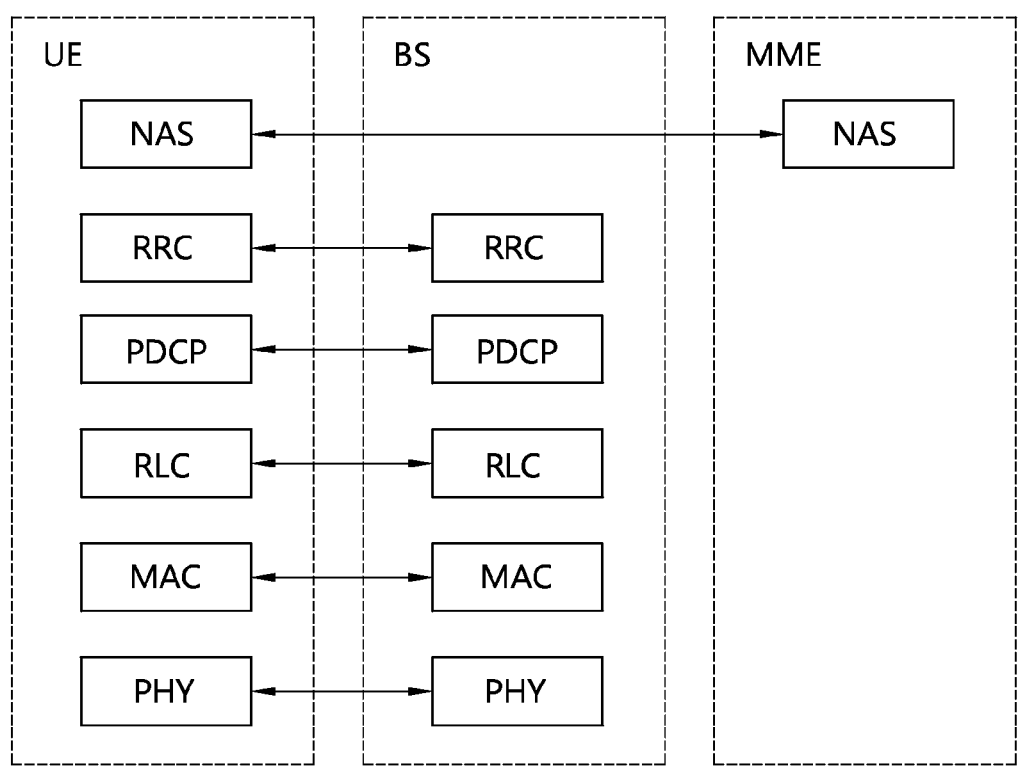
FIG. 3 is a block diagram showing a radio protocol architecture for a control plane.

FIG. 2 is a block diagram showing a radio protocol architecture for a user plane. FIG. 3 is a block diagram showing a radio protocol architecture for a control plane. The data plane is a protocol stack for the transmission of user data, and the control plane is a protocol stack for the transmission of a control signal.

Referring to FIGS. 2 and 3, a physical (PHY) layer provides information transfer service to a higher layer using a physical channel. The PHY layer is connected to a Medium Access Control (MAC) layer, that is, a higher layer, through a transport channel. Data is moved between the MAC layer and the PHY layer through the transport channel. The transport channel is classified depending on how data is moved according to what characteristic through a radio interface.

Data is moved between different PHY layers, that is, the PHY layers of a transmitter and a receiver through a physical channel. The physical channel may be modulated according to an Orthogonal Frequency Division Multiplexing (OFDM) scheme, and the physical channel uses the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through a logical channel.

The functions of the RLC layer include the concatenation, segmentation, and reassembly of an RLC SDU. In order to guarantee various types of Quality of Service (QoS) necessary for a Radio Bearer (RB), the RLC layer provides three operation modes: Transparent Mode (TM), Unacknowledged Mode (UM), and Acknowledged Mode (AM). AM RLC provides error correction through an Automatic Repeat Request (ARQ).

The functions of a Packet Data Convergence Protocol (PDCP) layer in the user plane include the transfer of user data and the compression and ciphering of a header. The functions of the PDCP layer in the user plane further include the transfer and encryption/integrity protection of control plane data.

The RRC layer is defined only in the control plane. The RRC layer is related to the configuration, reconfiguration, and release of radio bearer and is responsible for control of logical channels, transport channels, and physical channels. An RB means a logical route that is provided by the first layer (PHY layer) and the second layers (MAC layer, RLC layer, and PDCP layer) in order to transfer data between UE and a network.

To configure an RB means a process of defining the characteristics of a radio protocol layer and channels in order to provide specific service and configuring each detailed parameter and operating method. An RB may be divided into a Signaling RB (SRB) and a Data RB (DRB). The SRB is used as a passage through which an RRC message is transmitted in the control plane, and the DRB is used as a passage through which user data is transmitted in the user plane.

If an RRC connection is established between the RRC layer of UE and the RRC layer of an E-UTRAN, the UE is in an RRC-connected state. If not, the UE is in an RRC idle state.

A downlink transport channel through which data is transmitted from a network to UE includes a broadcast channel (BCH) through which system information is transmitted and a downlink shared channel (SCH) through which user traffic or a control message is transmitted. Traffic or a control message for downlink multicast or broadcast service may be transmitted through a downlink SCH or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or a control message is transmitted.

Logical channels placed over a transport channel and mapped to a transport channel include a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. An RB is a resources allocation unit, and the RB includes a plurality of OFDM symbols and a plurality of subcarrier. Furthermore, each subframe can use specific subcarriers of specific OFDM symbols (e.g., the first OFDM symbol) of the corresponding subframe for a Physical Downlink Control Channel (PDCCH), that is, an L1/L2 control channel. A Transmission Time Interval (TTI) is a unit time for subframe transmission.

An RRC state of UE and an RRC connection method are described below.

An RRC state means whether or not the RRC layer of UE is logically connected to the RRC layer of an E-UTRAN. A case where the RRC layer of UE is logically connected to the RRC layer of an E-UTRAN is called an RRC-connected state. A case where the RRC layer of UE is not logically connected to the RRC layer of an E-UTRAN is called an RRC idle state. An E-UTRAN can check the existence of UE in an RRC-connected state in a cell unit because RRC connection is present in UE, and thus UE can be effectively controlled. In contrast, UE in an RRC idle state is not checked by an E-UTRAN and is managed by a core network in a tracking area unit, that is, an area unit larger than a cell. That is, the existence or non-existence of UE in an RRC idle state is checked only in a large area unit. Thus, UE needs to shift to an RRC-connected state in order to receive common mobile communication service, such as voice or data.

When a user firsts turns on UE, the UE first searches for a proper cell and remains in an RRC idle state in the corresponding cell. The UE in the RRC idle state establishes an RRC connection with an E-UTRAN through an RRC connection procedure when it is necessary to establish the RRC connection and shifts to an RRC-connected state. A case where UE in an RRC idle state needs to establish an RRC connection includes several cases. For example, the cases can include a need for the transmission of uplink data for a reason, such as a call attempt by a user, or the transmission of a response message as a response to a paging message received from an E-UTRAN.

A Non-Access Stratum (NAS) layer placed over the RRC layer performs functions, such as session management and mobility management.

In order for the NAS layer to manage the mobility of UE, two types of states: EPS Mobility Management-REGISTERED (EMM-REGISTERED) and EMM-DEREGISTERED are defined. The two states are applied to UE and an MME. Initially, UE is in the EMM-DEREGISTERED state. The UE performs a process of registering it with a network through an initial attach procedure in order to access the corresponding network. If the attach procedure is successfully performed, the UE and the MME become the EMM-REGISTERED state.

In order to manage a signaling connection between UE and an EPC, two types of states: an EPS Connection Management (ECM)-IDLE state and an ECM-CONNECTED state are defined. The two states are applied to UE and an MME. When UE in the ECM-IDLE state establishes an RRC connection with an E-UTRAN, the corresponding UE becomes the ECM-CONNECTED state. An MME in the ECM-IDLE state becomes the ECM-CONNECTED state when the MME establishes an S1 connection with the E-UTRAN. When UE is in the ECM-IDLE state, an E-UTRAN does not have information about the context of the UE. Accordingly, UE in the ECM-IDLE state performs a UE-based mobility-related procedure, such as cell selection or cell reselection, without a need to receive a command from a network. In contrast, when UE is in the ECM-CONNECTED state, the mobility of the UE is managed in response to a command from a network. If the location of UE in the ECM-IDLE state is different from a location known to a network, the UE informs the network of its corresponding location through a tracking area update procedure.

System information is described below.

System information includes essential information that needs to be known by UE in order for the UE to access a BS. Accordingly, the UE must have received all pieces of system information before accessing the BS and must always have the up-to-date system information. Furthermore, the system information is information that needs to be known by all pieces of UE within one cell, and the BS periodically transmits the system information.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs information about the transmission of SIBs, for example, a transmission cycle. The SIB is a set of pieces of correlated system information. For example, what SIB includes only information about surrounding cells, and what SIB includes only information about uplink radio channels used by UE.

A BS transmits a paging message in order to inform UE whether or not system information has been changed. In this case, the paging message can include a system information change indicator. UE receives a paging message according to paging discontinuous reception (DRX). If the paging message includes a system information change indicator, the UE receives system information that is transmitted through a BCCH, that is, a logical channel.

Figure 4:
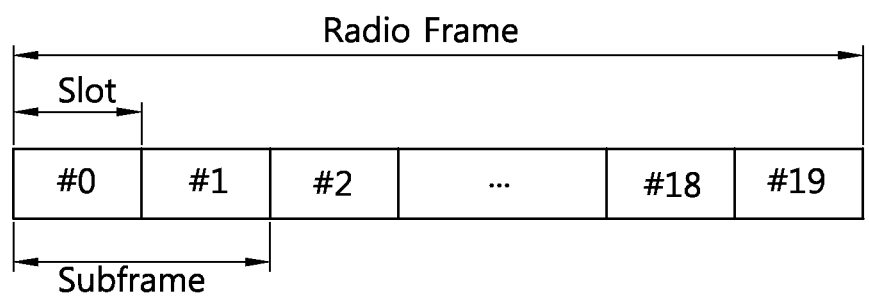
FIG. 4 is a diagram showing the structure of a radio frame which can be used in a wireless communication system.

FIG. 4 is a diagram showing the structure of a radio frame which can be used in a wireless communication system.

Referring to FIG. 4, the radio frame consists of 10 subframes, and one subframe consists of 2 slots. The time that is taken for one subframe to be transmitted is called a Transmission Time Interval (TTI). For example, the length of one subframe may be 1 ms, and the length of one slot may be 0.5 ms. One slot includes a plurality of Single Carrier-Frequency Division Multiple Access (SC-FDMA) symbols (or OFDMA symbols) in the time domain and includes a plurality of resource blocks in the frequency domain.

The structure of the radio frame is only illustrative, and the number of subframes included in a radio frame, the number of slots included in a subframe, and the number of SC-FDMA symbols included in a slot can be changed in various ways.

Random access is described below. Random access is used for UE to obtain uplink synchronization with a BS or to have uplink radio resources allocated thereto. After being powered on, UE initially obtains downlink synchronization with a cell and receives system information. Furthermore, the UE obtains a set of available random access preambles and information about radio resources used to transmit random access preambles from the system information. The radio resources used to transmit random access preambles can be specified as a radio frame and/or a set of one or more subframes. The UE transmits random access preambles randomly selected from the set of random access preambles. The BS that has received the random access preambles sends a Timing Alignment (TA) value for uplink synchronization to the UE through a random access response. Accordingly, the UE obtains uplink synchronization.

Figure 5:
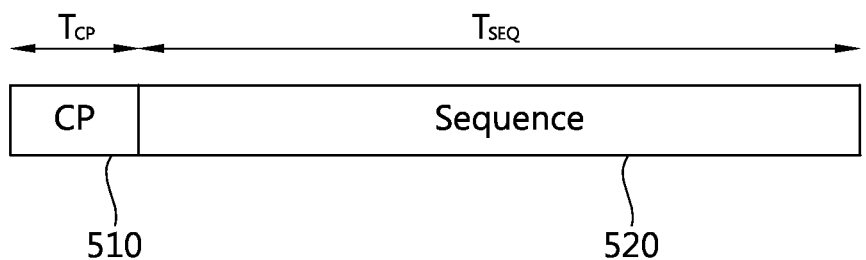
FIG. 5 is a diagram showing the structure of a random access preamble.

FIG. 5 is a diagram showing the structure of a random access preamble.

Referring to FIG. 5, the random access preamble includes a cyclic prefix (CP) 510 and a preamble sequence 520. The length of the cyclic prefix can be represented as $T_{CP}$, and the length of the preamble sequence can be represented as $T_{SEQ}$.

The random access preamble may have a different format depending on a frame structure and a random access configuration. For this, reference can be made to Table 1 below. In Table 1, $T_s$ indicates a basic time unit.

TABLE 1

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |

A BS allocates random access preambles designated to specific UE, and the UE performs non-contention random access using the corresponding random access preambles. That is, in a process of selecting a random access preamble, contention-based random access in which UE randomly selects one random access preamble from a specific set and uses the selected random access preamble and non-contention random access in which UE uses a random access preamble allocated to only specific UE by a BS may be present. Non-contention random access can be used in a procedure for handover or when it is requested by a command from a BS.

Figure 6:
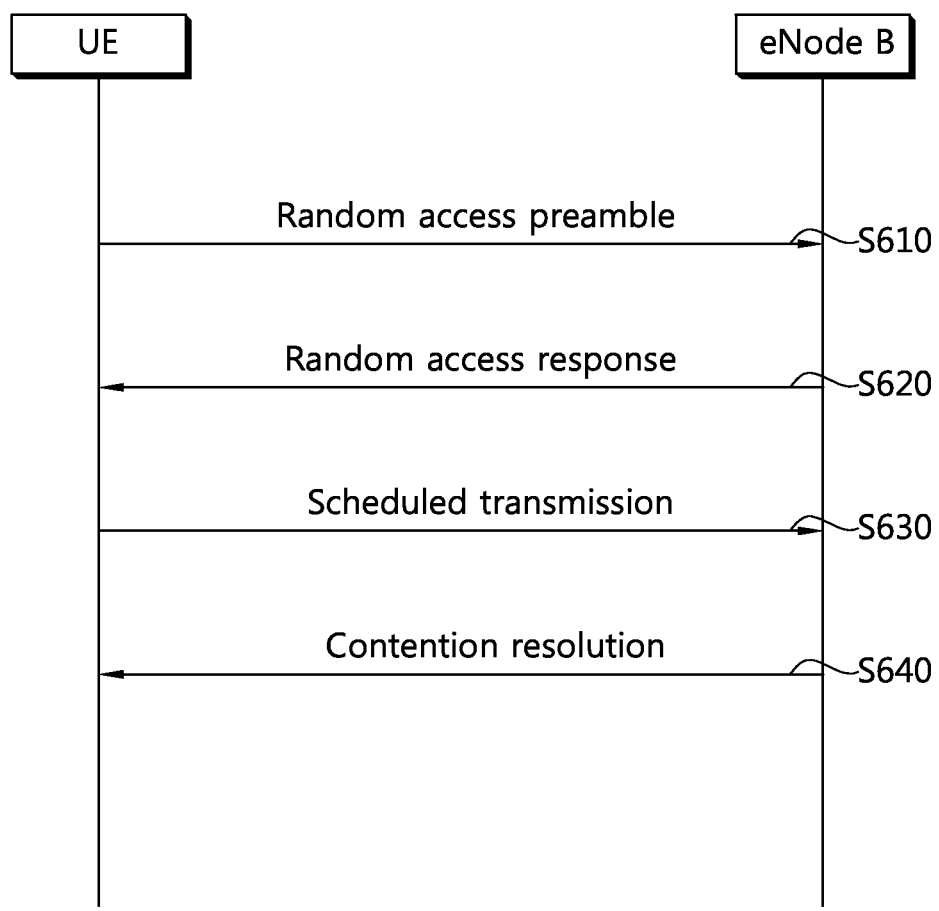
FIG. 6 is a diagram showing a contention-based random access method.

FIG. 6 is a diagram showing a contention-based random access method.

Referring to FIG. 6, UE randomly selects one random access preamble from a set of random access preambles indicated by system information or a handover command. Furthermore, the UE selects radio resources through which the random access preamble can be transmitted and transmits the selected random access preamble (S610). The radio resources can be a specific subframe, which may be for selecting a physical random access channel (PRACH).

After transmitting the random access preamble, the UE attempts to receive a random access response within a random access response reception window indicated by the system information or the handover command and thus receives a random access response (S620). The random access response is transmitted in an MAC PDU format, and the MAC PDU can be transmitted through a Physical Downlink Shared Channel (PDSCH). Furthermore, a Physical Downlink Control Channel (PDCCH) is also transferred to the UE so that the UE may properly receive information transferred through the PDSCH. That is, the PDCCH includes information about the UE that receives the PDSCH, information about the frequency and time of radio resources of the PDSCH, and the transport format of the PDSCH, etc. If the UE successfully receives the PDCCH transferred thereto, the UE properly receives the random access response that is transmitted through the PDSCH based on the PDCCH information.

The random access response can include a random access preamble ID, an UL grant (uplink radio resources), a temporary Cell—Radio Network Temporary Identifier (C-RNTI), and a Time Alignment Command (TAC). Since one random access response can include random access response information for one or more pieces of UE, a random access preamble ID can be included in order to inform that an UL grant, a temporary C-RNTI, and a TAC included in the random access response are valid for what UE. The random access preamble ID can be an ID of a random access preamble received by an eNode B. The TAC can be included as information on which the UE coordinates uplink synchronization. The random access response can be indicated by a random access ID on a PDCCH, that is, a Random Access-Radio Network Temporary Identifier (RA-RNTI).

When the UE receives a random access response valid for the UE, the UE processes information included in the random access response and performs transmission scheduled for the eNode B (S630). That is, the UE applies the TAC and stores a temporary C-RNTI. Furthermore, the UE transmits data stored in the buffer of the UE or newly generated data to the eNode B using an UL grant. In this case, the data needs to include information on which the UE can be identified. This is because the eNode B is unaware that what pieces of UE perform random access in a contention-based random access process. Thus, it is necessary to identify the UE for a subsequent contention resolution.

A method of including information capable of identifying UE includes two types of methods. If the UE has already had a valid cell ID allocated thereto in a corresponding cell before performing random access, the UE transmits its own cell ID through an UL grant. In contrast, if a valid cell ID has not been allocated to the UE prior to a random access process, the UE transmits data including its own unique ID (e.g., an S-TMSI or a random ID). In general, the unique ID is longer than a cell ID. If the UE has transmitted the data through the UL grant, the UE starts a timer for a contention resolution (contention resolution timer).

After the UE receives the random access response and transmits the data including its own ID through the allocated UL grant, the UE waits for an instruction from the eNode B for a contention resolution (S640). That is, the UE attempts to receive a PDCCH in order to receive a specific message. Two types of methods can be proposed as a method of receiving a PDCCH. If its own ID transmitted through the UL grant as described above is a cell ID, the UE can attempt to receive a PDCCH using its own cell ID. In this case, if the UE receives a PDCCH through its own cell ID before the contention resolution timer expires, the UE determines that the random access has been normally performed and terminates the random access. If the ID transmitted through the UL grant is a unique ID, the UE attempts to receive a PDCCH using a temporary C-RNTI included in the random access response. In this case, if the UE has received a PDCCH through a temporary cell ID before the contention resolution timer expires, the UE checks data transferred through a PDSCH indicated by the PDCCH. If its own unique ID is included in the data, the UE can determine that the random access has been normally performed and terminate the random access.

Figure 7:
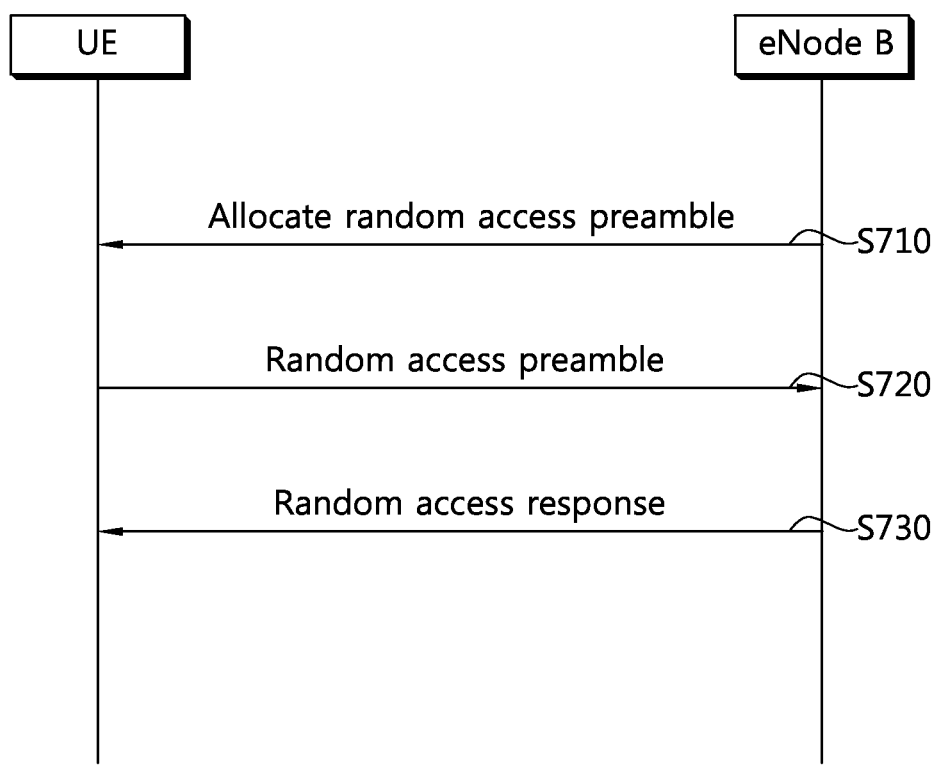
FIG. 7 is a diagram showing a non-contention-based random access method.

FIG. 7 is a diagram showing a non-contention-based random access method. Unlike the contention-based random access, non-contention-based random access can be terminated when UE receives a random access response.

Non-contention-based random access can be initiated in response to handover and/or a request, such as a command from an eNode B. In the two cases, contention-based random access can be performed.

UE receives a designated random access preamble without a contention possibility from an eNode B. The allocation of the random access preamble may be performed in response to a handover command and a PDCCH command (S710).

After the random access preamble designated to the UE is allocated to the UE, the UE transmits the corresponding random access preamble to the eNode B (S720).

When the random access preamble is received, the eNode B transmits a random access response to the UE as a response (S730). For a procedure related to the random access response, reference can be made to S620 of FIG. 6.

A method for a contention resolution in random access is described below.

The reason why a contention is generated in performing random access is that the number of random access preambles is basically limited. That is, since an eNode B cannot assign UE-unique random access preambles to all pieces of UE, UE randomly selects one of common random access preambles and transmits the selected random access preamble. Accordingly, two or more pieces of UE may select the same random access preamble and transmit the selected random access preamble through the same radio resources (PRACH resources), but an eNode B determines the received random access preamble to be one random access preamble received from one piece of UE. For this reason, the eNode B transmits a random access response to UE and expects that the random access response will be received by one piece of UE. However, since a contention can occur as described above, the two or more pieces of UE receive the one random access response, and thus each of the pieces of UE performs an operation according to the reception of the random access response. That is, there is a problem in that the two or more pieces of UE transmit different data through the same radio resources using one UL grant included in the random access response. As a result, the transmission of the data may all fail, and the eNode B may receive only the data of specific UE depending on the locations or transmission power of the pieces of UE. In the latter case, since all the two or more pieces of UE assume that the transmission of their own data has been successful, the eNode B needs to inform pieces of UE that have failed in the contention of information about the failure. That is, to inform information about the failure or success of a contention is called a contention resolution.

A contention resolution method includes two types of methods. One method includes a method using a contention resolution timer (hereinafter called a CR timer), and the other method is a method of transmitting an ID of successful UE to pieces of UE. The earlier case is used when UE already has a unique cell ID (C-RNTI) prior to a random access process. That is, UE already having a cell ID transmits data, including its own cell ID, to an eNode B in response to a random access response, and actuates a CR timer. If PDCCH information including its own cell ID is received before the CR timer expires, the UE determines that it has been successful in a contention and normally terminates random access. If the UE has not received a PDCCH including its own cell ID before the CR timer expires, however, the UE determines that it has failed in a contention and may perform a random access process again or inform a higher layer of the failure fact. From among the contention resolution methods, the latter case, that is, a method of transmitting an ID of UE, is used when UE does not have a unique cell ID prior to a random access process. That is, if UE does not have its own cell ID, the UE transmits data, including an ID (S-TMSI or random ID) higher than a cell ID, based on UL grant information included in a random access response and actuates a CR timer. If the UE receives data including its own higher ID through a DL-SCH before the CR timer expires, the UE determines that a random access process has been successful. In contrast, if the UE has not received data including its own higher ID through a DL-SCH before the CR timer expires, the UE determines that a random access process has failed.

Machine Type Communication (MTC) is described below.

MTC means that communication is performed between machines without intervention of a person. UE used in MTC is an MTC device. MTC may also be called Machine to Machine (M2M). Services provided through MTC are different from services in existing communication in which a person intervenes. Services of categories, such as tracking, metering, payment, medical service, and remote control, can be provided.

Figure 8:
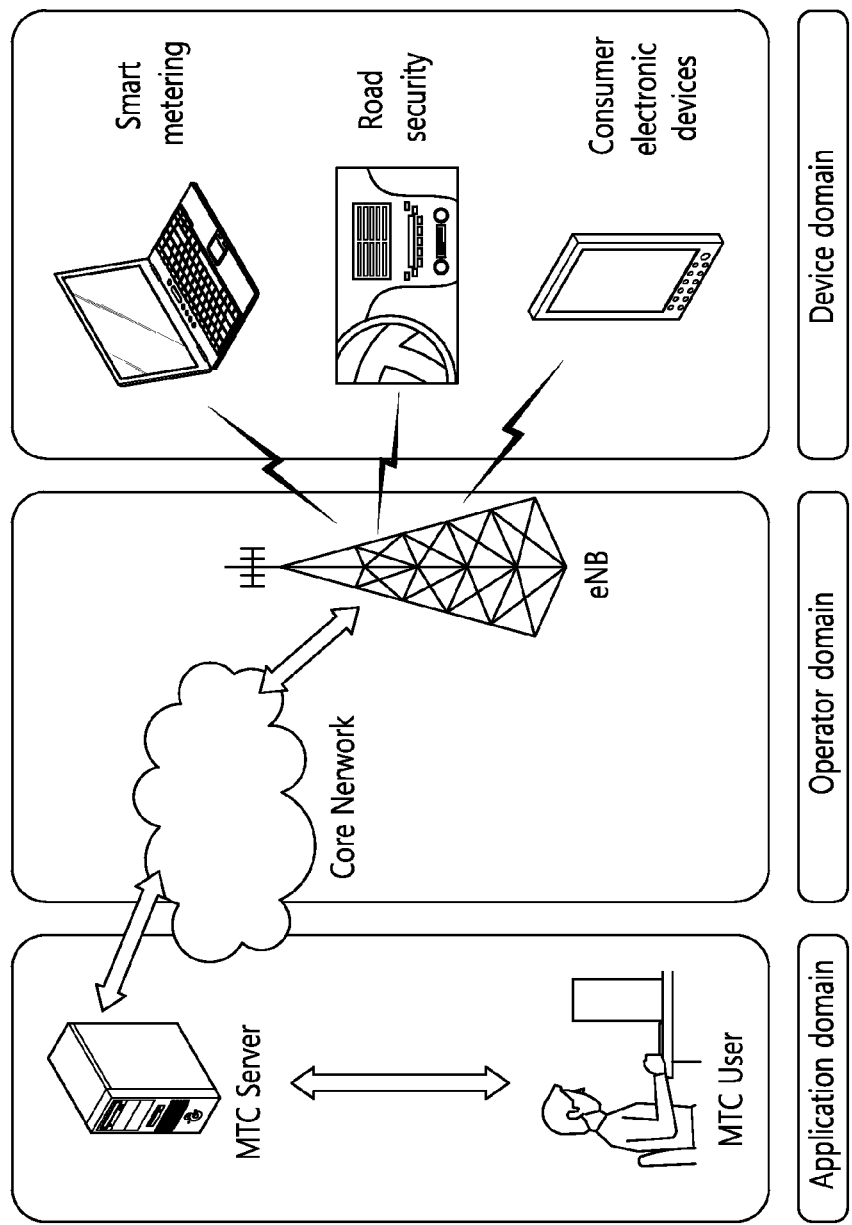
FIG. 8 is a diagram showing the structure of MTC.

FIG. 8 is a diagram showing the structure of MTC.

Referring to FIG. 8, an MTC device can communicate with another MTC device or an MTC server over a Public Land Mobile Network (PLMN). The MTC server can provide an MTC user with metering, road information, and user electronic device control, that is, services provided through the MTC device.

In order to efficiently support such MTC services, features, such as the low mobility, time tolerance, and small data transmission of an MTC device, may be taken into consideration. Furthermore, numerous MTC devices may be assumed to be present in one cell.

Meanwhile, if a communication system in which a large number of MTC devices are present in one cell is assumed, a large number of MTC devices may perform random access in a specific situation. In this case, a problem in that a system load is increased may be caused. Furthermore, if an MTC device and common UE performs the above-described random access, they use the same random access resources. In this case, there is a problem in that an eNode B is unable to check whether UE that requests random access is an MTC device or common UE. In order to solve such a problem, random access resources available to a specific type of UE, such as MTC, may be further limited, or a limit may be imposed to UE in selecting a random access preamble for transmission. The specific type may be an MTC type and/or an M2M type. Random access resources may be limited depending on a specific purpose instead of the above-described specific type. As the specific purpose, radio resources that are limited and restricted when the radio resources are used for delay-tolerant access and/or low priority access purposes can be configured. Furthermore, radio resources that are limited and restricted when the radio resources are used for purposes, such as a specific setup cause for RRC connection setup and/or a call type, can be configured. An example in which available random access resources are radio frame and/or subframes is described below.

FIG. 9 is a flowchart showing a method of performing random access in accordance with an embodiment of the present invention.

Referring to FIG. 9, UE obtains information about available uplink radio resources for random access (S910). The information about available uplink radio resources can be included in system information broadcasted by an eNode B and transmitted by the eNode B. The information about available uplink radio resources can be information indicative of at least one subframe for the transmission of a random access preamble. In addition, the information about available uplink radio resources can further include information indicative of a preamble format, such as that shown in FIG. 5. The information about available uplink radio resources is described in more detail below with reference to FIG. 10.

FIG. 10 is a diagram showing available uplink radio resources for random access in accordance with an embodiment of the present invention.

Referring to FIG. 10, available uplink radio resources for random access in accordance with an embodiment of the present invention can be specified by a preamble format, a system frame number, and a subframe number, and specific uplink radio resources can be indexed by a PRACH configuration index.

The preamble format is set to a value indicative of the four formats of random access preambles described above with reference to FIG. 5. The preamble format can have one of values 0 to 3. The preamble format can be determined depending on a cell environment, a network state, etc. The preamble format 0 can be used in a common environment. The preamble format 1 can be used when time delay is great as in a cell environment having a large radius. The preamble format 2 can be used when a cell radius is within 30 km in the case where sequences are repeatedly transmitted with consideration taken of a low Signal to Interference Noise Ratio (SINR). The preamble format 3 can be used when a cell radius is within 100 km in the case where sequences are repeatedly transmitted with consideration taken of a low SINR.

The system frame number can be set to a value that specifies a radio frame which can be used as a PRACH, that is, radio resources for random access, from among the above-described radio frames. The system frame number can be set to indicate that all radio frames can be used for random access or can be set to indicate that a radio frame having a specific index, such 'any' and/or 'even', can be used for random access.

The subframe number can be set to indicate an index number of a subframe which can be used for random access within a radio frame. The number of subframes which can be used as a PRACH for random access within a radio frame can be at least one.

UE can receive an available subframe allocated thereto for transmitting a random access preamble through uplink radio resources information included in system information and can check the allocated available subframe. For example, when UE receives available uplink radio resources information configured to set '8' as a PRACH configuration index, the UE can be aware that a random access preamble can be transmitted through the Nos. '3' and '8' formats of all radio frames. In this case, the UE can be aware that the preamble format uses a No. '0' format.

Referring back to FIG. 9, the UE selects one of one or more available subframes allocated thereto and determines a random access preamble (S920). A subframe that can be selected by a specific type of UE, such as an MTC device, is different from a subframe that can be selected by common UE. That is, a subframe that can be selected by a specific type of UE, such as an MTC device, for the transmission of a random access preamble can be limited. This is described above with reference to FIG. 11.

Figure 11:
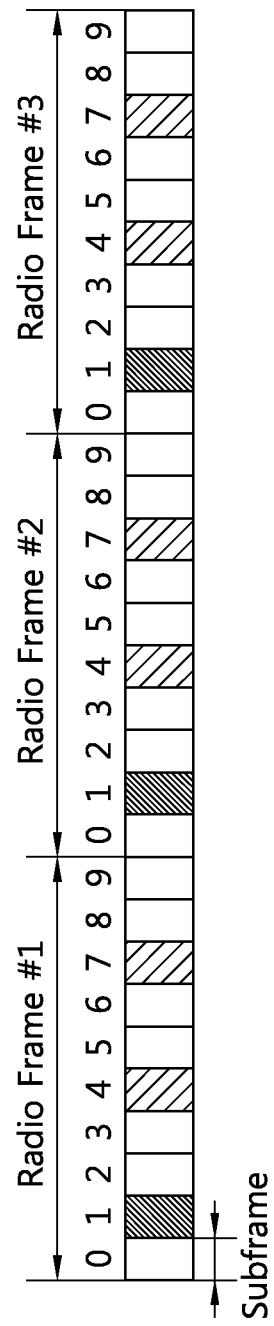
FIG. 11 is a diagram showing an example in which subframes for a specific type of UE are limited in accordance with an embodiment of the present invention.

FIG. 11 is a diagram showing an example in which subframes for a specific type of UE are limited in accordance with an embodiment of the present invention. It is assumed that the Nos. 1, 4, and 7 subframes of all radio frames have been allocated to UE as available subframes (hereinafter can be called 'first subframes') through the reception of available uplink radio information.

Referring to FIG. 11, the No. 1 subframe of the allocated available subframes within one radio frame can be used by both a specific type of UE and/or a normal type of UE for a random access preamble transmission purpose. A subframe that can be used by a specific type of UE as described above is a specific subframe (hereinafter can be called a 'second subframe'), whereas the Nos. 4 and 7 subframes can be used by only a normal type of UE for the transmission of a random access preamble.

Accordingly, if UE trying to perform random access is common UE, the UE can select one of the Nos. 1, 4, and 7 subframes indicated by available uplink radio resources information included in system information and transmit a random access preamble using the selected subframe.

In contrast, if UE trying to perform random access is a specific type of UE, the UE can transmit a random access preamble using only the No. 1 subframe configured to be used by only a specific type of UE, from among the Nos. 1, 4, and 7 subframes.

To check, by the specific type of UE, which one of available subframes is a specific subframe can be performed based on information about the specific subframe which is additionally signaled. The additionally signaled information about a specific subframe can be included in system information along with information about available subframes and then transmitted.

The information about a specific subframe can be implemented in the form of a bitmap sequence. If 3 subframes have been allocated as available subframes as in FIG. 11, an eNode B can provide the UE with information about a specific subframe that has been implemented in the form of a bitmap sequence having (1 0 0). After checking what available subframe is what subframe through a PRACH configuration index, the specific type of UE can check that information about a specific subframe is (1 0 0) and can be aware that the first available subframe within each radio frame is the specific subframe. Accordingly, the UE can transmit a random access preamble through the specific subframe. If a specific subframe is identically given to each radio frame as described above, a bitmap sequence indicative of the specific subframe within one radio frame can be configured. Meanwhile, a bitmap sequence indicative of a specific subframe within two or more radio frames can be configured. In this case, in the drawing, a bitmap sequence (1 0 0 1 0 0 1 0 0) can be configured.

Unlike in the drawing, an eNode B can provide UE with specific subframe information about two or more radio frames. For example, if a bitmap sequence is implemented using (1 0 0 0 1 0 0 0 1), UE can check the No. 1 subframe as a specific frame in relation to a first radio frame, the No. 4 subframe as a specific frame in relation to a second radio frame, and the No. 7 subframe as a specific frame in relation to a third radio frame.

Meanwhile, if one or more available subframes have been allocated, what subframe is a specific subframe may have been previously configured. For example, in available uplink radio resources, such as FIG. 10, a specific subframe corresponding to a PRACH configuration index may have been previously configured. In this case, UE can be aware of available subframes and a specific subframe by receiving information about available uplink radio resources and checking a PRACH configuration index. Furthermore, subframes having the fastest index and/or the latest index, from among available subframes, can be previously configured as specific subframes.

Referring back to FIG. 9, the UE transmits a selected random access preamble to the eNode B through the selected subframe (S930). Common UE can select one of one or more available subframes and transmit a random access preamble through the selected available subframe. Specific UE can select one of one or more specific subframes allocated thereto and transmit a random access preamble through the selected specific subframe. Meanwhile, in the above case, the transmitted random access preamble is selected and used by UE when the UE performs contention-based random access, but a random access preamble specified by an eNode B can be used when UE performs non-contention-based random access.

As a response to the transmitted random access preamble, the UE receives a random access response from the eNode B (S940). Non-contention-based random access is terminated by receiving a random access preamble response, but scheduled transmission and contention resolution steps can be performed in contention-based random access.

The step S930 of transmitting the random access preamble to the eNode B, the step S940 of receiving the random access response, and the step of performing scheduled transmission and contention resolution can be performed like corresponding steps of the contention/non-contention-based random access method of FIGS. 5 and 7 described above.

When the random access method of the present invention described above with reference to FIGS. 9 to 11 is performed, the eNode B can detect overload for radio resources according to access by the UE. This can be detected using the following method.

1) Overload due to common access (access by common UE and a specific type of UE) within one cycle=(total energy detected in available subframes within one cycle)/(the number of available subframes within one cycle)

2) Overload due to a specific access (access by a specific type of UE) within one cycle=((total energy detected in a specific subframe within one cycle/the number of specific frames within one cycle)−(overload due to common access within one cycle))

The eNode B can limit or further activate a specific type of access based on overload due to each type of access as described above. For example, if overload due to common access within one cycle is greater than overload due to specific access within one cycle, Extended Access Barring (EAB) and back-off for the specific access are not used, but EAB and back-off for the common access can be used. This may be for controlling radio resources for random access, that is, overload of a RACH. In contrast, if overload due to common access within one cycle is smaller than overload due to specific access within one cycle, EAB and back-off for specific access can be used in order to control radio overload of resources for random access (i.e. RACH).

An eNode B can determine whether or not an RAN overload solution, such as EAB, can be used by distinguishing overload due to specific access and overload due to common access. That is, the eNode B can determine that an RAN overload solution, such as EAB, is used only when overload is generated due to specific access.

In performing random access as described above, UE can check that what subframe is an available subframe based on information about available uplink radio resources. If its own UE type is a specific type of UE, the UE can check a specific subframe in available subframes and transmit a random access preamble based on the check specific subframe. Accordingly, quality of service can be guaranteed even in a special radio environment, such as MTC, because radio resources for random access by common UE can be sufficiently guaranteed. Furthermore, an eNode B can detect overload due to each of specific access and common access and control the allocation/use of radio resources for a specific type of UE and/or common UE based on the detected overload. Accordingly, access/use efficiency of radio resources can be improved, and thus the overall efficiency of a wireless communication system can be improved.

Figure 12:
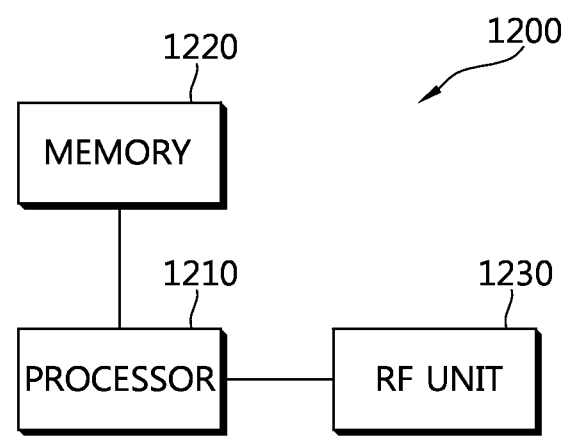
FIG. 12 is a block diagram showing a radio device in which an embodiment of the present invention can be implemented.

FIG. 12 is a block diagram showing a radio device in which an embodiment of the present invention can be implemented. Such a device can implement the operation of UE for performing random access in the embodiments of FIGS. 9 to 11.

The radio device 1200 includes a processor 1210, memory 1220, and a Radio Frequency (RF) unit 1230. The processor 1210 implements the proposed functions, processes and/or methods. The processor 1210 can be configured to determine a subframe for transmitting a random access preamble based on available uplink radio resources information, information about a specific available subframe, and the type of radio device which are included in received system information. The processor 1210 can be configured to transmit a random access preamble through a selected subframe and receive a random access response corresponding to the random access preamble. The processor 1210 can be configured to perform the overall procedure for scheduled data transmission and contention resolution based on information included in a received random access response. The processor 1210 can detect overload of an available subframe and overload of a specific subframe and control radio resources for random access based on the detected overload. The processor 1210 can be configured to implement the embodiments of the present invention described above with reference to FIGS. 9 to 11.

The RF unit 1230 is connected to the processor 1210, and it transmits and receives radio signals.

The processor 1210 may include Application-Specific Integrated Circuits (ASICs), other chipsets, logic circuits, and/or data processors. The memory 1220 may include Read-Only Memory (ROM), Random Access Memory (RAM), flash memory, memory cards, storage media and/or other storage devices. The RF unit 1230 may include a baseband circuit for processing radio signals. When an embodiment is implemented in software, the above-described scheme may be implemented using a module (process, function, etc.) that performs the above functions. The module may be stored in the memory 1220 and executed by the processor 1210. The memory 1220 may be placed inside or outside the processor 1210 and may be connected to the processor 1210 using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The invention claimed is:

1. A method of performing a random access channel (RACH) procedure, by a user equipment (UE), in a wireless communication system, comprising:
   receiving, by the UE, available uplink radio resource from a base station (BS),
   wherein the available uplink radio resource comprises a first subset of subframes allocated for a normal random access and a second subset of subframes allocated for a delay tolerant access;
   determining, by the UE, whether to perform the RACH procedure for the normal random access or the delay tolerant access;
   selecting, by the UE, at least one subframe, from the first subset of subframes when the UE determines to perform the RACH procedure for the normal random access, or from the second subset of subframes when the UE determines to perform the RACH procedure for the delay tolerant access,
   transmitting, by the UE, a random access preamble using the at least one selected subframe; and
   receiving, by the UE, a random access response in response to the transmitted random access preamble,
   wherein the UE is a Machine Type Communication (MTC) device which performs inter-device communication without user intervention,
   wherein an overload for the uplink radio resource is detected by using one of an equation for the normal random access and an equation for the delay tolerant access,
   wherein the equations for the normal random access and the delay tolerant access use a first parameter related to a total energy detected in specific subframes within one cycle and a second parameter related to a number of the specific subframes within one cycle.

2. The method of claim 1, further comprising receiving information about the second subset of subframes from the BS, wherein the information about the second subset of subframes indicates whether or not the first subset of subframes is able to be selected as the second subset of subframes.

3. The method of claim 2, wherein:
   the information about the second subset of subframes is a bitmap sequence,
   when a specific bit corresponding to the first subset of subframes is 1, the information about the second subset of subframes indicates that the first subset of subframes is able to be selected as the second subset of subframes, and
   when the specific bit is 0, the information about the second subset of subframes indicates that the first subset of subframes is unable to be selected as the second subset of subframes.

4. The method of claim 3, wherein:
   information about the first subset of subframes comprises a random access channel configuration index, and the random access channel configuration index is mapped to a set of subframe index values of the respective at least one first subset of subframes.

5. The method of claim 4, wherein the information about the first subset of subframes and the information about the second subset of subframes are included in system information transmitted by the BS through a broadcast channel.

6. The method of claim 5, wherein the information about the first subset of subframes further comprises a format indicator indicative of a random access preamble format corresponding to the random access channel configuration index.

7. The method of claim 6, wherein the transmitted random access preamble is the random access preamble format indicated by the format indicator.

8. A user equipment (UE) performing a random access channel (RACH) procedure in a wireless communication system, the UE comprises:
a Radio Frequency (RF) unit transmitting and receiving radio signals; and
a processor, functionally connected to the RF unit, that receives available uplink radio resource from a BS, wherein the available uplink radio resource comprises a first subset of subframes allocated for a normal random access and a second subset of subframes allocated for a delay tolerant access;
determines whether to perform the RACH procedure for the normal random access or the delay tolerant access;
selects at least one subframe, from the first subset of subframes when the UE determines to perform the RACH procedure for the normal random access, or from the second subset of subframes when the UE determines to perform the RACH procedure for the delay tolerant access; and
transmits a random access preamble using the at least one selected subframe; and
receives a random access response in response to the transmitted random access preamble,
wherein the UE is a Machine Type Communication (MTC) device which performs inter-device communication without user intervention,
wherein an overload for the uplink radio resource is detected by using one of an equation for the normal random access and an equation for the delay tolerant access,
wherein the equations for the normal random access and the delay tolerant access use a first parameter related to a total energy detected in specific subframes within one cycle and a second parameter related to a number of the specific subframes within one cycle.

9. The UE of claim 8, wherein:
the processor receives information about the second subset of subframes from the BS, and
the information about the second subset of subframes indicates whether or not the first subset of subframes is able to be selected as the second subset of subframes.

10. The UE of claim 9, wherein:
the information about the second subset of subframes is a bitmap sequence,
when a specific bit corresponding to the first subset of subframes is 1, the information about the second subset of subframes indicates that the first subset of subframes is able to be selected as the second subset of subframes, and
when the specific bit is 0, the information about the second subset of subframes indicates that the first subset of subframes is unable to be selected as the second subset of subframes.

11. The UE of claim 10, wherein:
information about the first subset of subframes comprises a random access channel configuration index, and
the random access channel configuration index is mapped to a set of subframe index values of the respective at least one first subset of subframes.

12. The UE of claim 11, wherein the information about the first subset of subframes and the information about the second subset of subframes are included in system information broadcasted transmitted by the BS and are transmitted.

13. The UE of claim 12, wherein the information about the first subset of subframes further comprises a format indicator indicative of a random access preamble format corresponding to the random access channel configuration index.

14. The UE of claim 13, wherein the transmitted random access preamble is the random access preamble format indicated by the format indicator.

* * * * *